US009056405B2

(12) United States Patent
Sato et al.

(10) Patent No.: US 9,056,405 B2
(45) Date of Patent: Jun. 16, 2015

(54) TREATMENT METHOD FOR MOLD TOOL SURFACE (71) Applicant: Japan Aviation Electronics Industry, Limited, Tokyo (JP)

(72) Inventors: Akinobu Sato, Tokyo (JP); Akiko Suzuki, Tokyo (JP); Takeshi Kawano, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 12 days.

(21) Appl. No.: 13/913,335

(22) Filed: Jun. 7, 2013

(65) Prior Publication Data
US 2013/0270734 A1 Oct. 17, 2013

Related U.S. Application Data

(62) Division of application No. 12/877,985, filed on Sep. 8, 2010, now abandoned.

(51) Int. Cl.
*B29C 33/42* (2006.01)

(52) U.S. Cl.
CPC ........................ *B29C 33/42* (2013.01)

(58) Field of Classification Search
CPC ........................................ B29C 33/42
USPC ................................ 164/6; 216/66
See application file for complete search history.

(56) References Cited

U.S. PATENT DOCUMENTS

| 7,420,189 | B2 * | 9/2008 | Imamura et al. | ......... 250/492.21 |
| 7,622,050 | B2 * | 11/2009 | Otsuka et al. | ................... 216/66 |
| 8,328,371 | B2 * | 12/2012 | Taniguchi | ..................... 359/601 |
| 2001/0003384 | A1 | 6/2001 | Morita | |
| 2007/0176320 | A1 | 8/2007 | Nakamura | |
| 2009/0029189 | A1 | 1/2009 | Moriwaki | |

FOREIGN PATENT DOCUMENTS

| JP | 8-120470 A * | 5/1996 | ............... C23F 4/00 |
| JP | 2008-276907 | 11/2008 | |
| JP | 2008-307735 | 12/2008 | |
| JP | 2009-045925 | 3/2009 | |
| JP | 2011-042063 | 3/2011 | |

OTHER PUBLICATIONS

China Office action, dated Jul. 19, 2013 along with an english translation thereof.
Japan Office action, dated Aug. 13, 2013 along with an english translation thereof.

(Continued)

*Primary Examiner* — Kevin P Kerns
(74) *Attorney, Agent, or Firm* — Greenblum & Bernstein, P.L.C.

(57) ABSTRACT

The average roughness Ra of a mold tool surface that comes into contact with a material to be molded measured for a measurement area 10 μm square or smaller is equal to or lower than 5 nm, and fine granular projection structures having diameters ranging from 10 to 80 nm and heights ranging from 10 to 40 nm are formed on the mold tool surface with a density of 400/μm² or higher. The frictional force due to the anchoring effect or the digging effect is reduced, and the adhesive force due to meniscus is also reduced. The release resistance is significantly reduced without affecting the dimensional precision of a fine molded product.

2 Claims, 9 Drawing Sheets

(56) References Cited

OTHER PUBLICATIONS

Kobayashi et al., "Relationship between Core Surface Roughness and Ejection Force for Injection Molding," Journal of the Japan Society for Precision Engineering, vol. 67, No. 3, 2001, pp. 510-514.
Excerpt from Yamada, "Fundamentals and applications of cluster ion beam," Nikkan Kogyoshinbunsha, Oct. 31, 2006, pp. 57, 70, 71, 72, 84 and 85.
Austin et al., "Fabrication of 5 nm linewidth and 14 nm pitch features by nanoimprint lithography," Applied Physics Letter vol. 84, No. 26, Jun. 2004, pp. 5299-5301, http://dx.doi.org/10.1063/1.1766071.
Office Action issued on Jan. 23, 2013 by the Patent Office of the People's Republic of China for counterpart foreign patent application CN 2010 10277812.2.
First office action for corresponding Taiwan patent application No. 099131243 issued Feb. 25, 2013.

* cited by examiner

TABLE 1

| | SURFACE TREATMENT | Ra (nm) | | RATE OF SUCCESSFUL RELEASING |
| --- | --- | --- | --- | --- |
| | | AREA 80μm SQUARE | AREA 1μm SQUARE | |
| MOLD TOOL 1 | GROUND WITH #400 GRINDSTONE | 215 | 33.5 | 100 |
| MOLD TOOL 2 | GROUND WITH #600 GRINDSTONE | 78.6 | 17.1 | 0 |
| MOLD TOOL 3 | GROUND WITH #600 GRINDSTONE AND GCIB-TREATED | 76.5 | 3.4 | 98 |

TABLE 2

| | Va(keV) | θ (deg) | N(ions/cm²) |
|---|---|---|---|
| MOLD TOOL 4 | 20 | 0 | $2 \times 10^{17}$ |
| MOLD TOOL 5 | 30 | 10 | $5 \times 10^{16}$ |
| MOLD TOOL 6 | 30 | 45 | $7 \times 10^{17}$ |
| MOLD TOOL 7 | 10 | 0 | $8 \times 10^{16}$ |

FIG. 8

TABLE 3

| | DENSITY(/μm²) | HEIGHT(nm) | DIAMETER(nm) | Ra(nm)[AREA 1μm SQUARE] |
|---|---|---|---|---|
| MOLD TOOL 4 | 400 | 15-40 | 20-80 | 4.92 |
| MOLD TOOL 5 | 480 | 10-30 | 10-70 | 1.92 |
| MOLD TOOL 6 | 640 | 10-30 | 25-80 | 3.34 |
| MOLD TOOL 7 | 1280 | 10-25 | 20-50 | 1.70 |

TABLE 4

| | N(ions/cm$^2$) | RATE OF SUCCESSFUL RELEASING (%) | FINE GRANULAR PROJECTION STRUCTURES |
|---|---|---|---|
| SKD11 | 5×10$^{15}$ | 15 | NOT FORMED |
| SKD11 | 2×10$^{16}$ | 100 | FORMED |
| V20 | 1×10$^{16}$ | 20 | NOT FORMED |
| V20 | 5×10$^{16}$ | 98 | FORMED |

TREATMENT METHOD FOR MOLD TOOL SURFACE

This application is a divisional application of a parent application Ser. No. 12/877,985, filed Sep. 8, 2010, now abandoned.

TECHNICAL FIELD

The present invention relates to a mold tool and a treatment method for a mold tool surface.

BACKGROUND ART

In a process of molding a resin (plastic) product, a glass product, a metal product or the like with a mold tool, the product may be hard to release from the mold tool because of friction between the product and the mold tool. As known, the release resistance relates to the surface roughness of the mold tool. In the following, this will be described, taking resin molding as an example.

Figure 1:
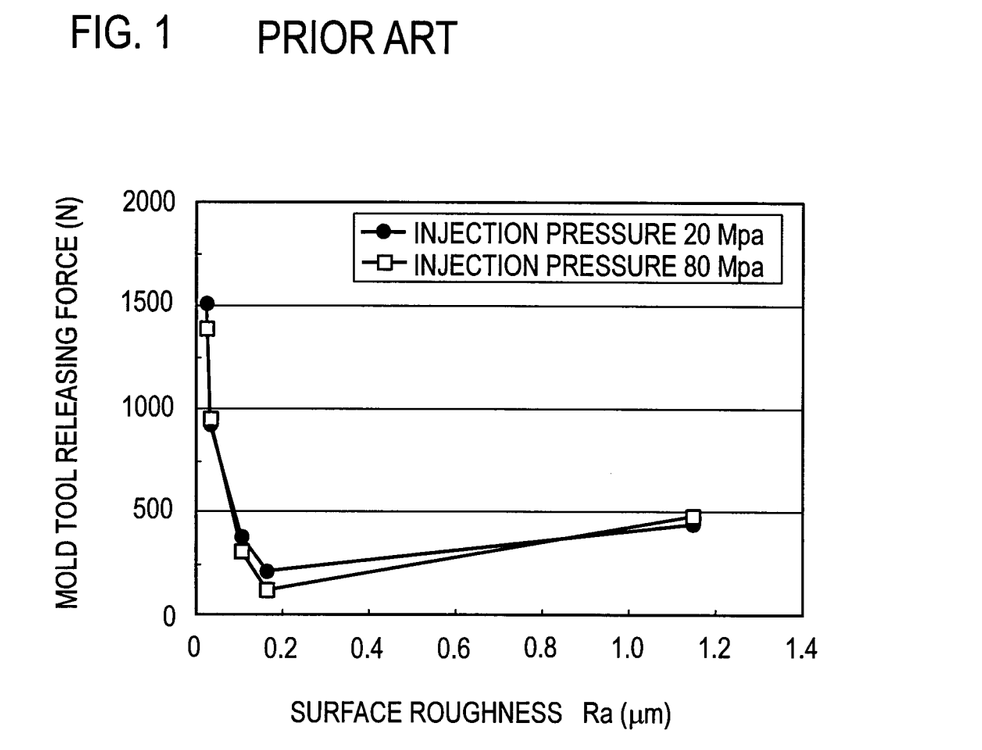
FIG. 1 is a graph showing a relationship between the surface roughness and the mold tool releasing force.

FIG. 1 is a graph showing relationships between the surface roughness and the mold tool releasing force (release resistance) shown in Non-Patent Literature 1. As shown, the release resistance decreases with the surface roughness (average roughness) Ra until the surface roughness Ra reaches about 0.2 μm. However, in the range of the surface roughness equal to or lower than about 0.2 μm, the release resistance rapidly increases as the surface roughness decreases.

The reason why the release resistance decreases with the surface roughness in the range of the surface roughness Ra higher than about 0.2 μm is that the frictional resistance caused by the anchoring effect of the resin penetrating into the irregularities on the mold tool surface or digging of the resin by sharp projections on the mold tool surface decreases. However, in the range of the surface roughness Ra equal to or lower than about 0.2 μm, the adhesive force between the solid surfaces probably increases and becomes predominant in the frictional force to increase the release resistance.

In the range of Ra equal to or lower than 0.2 μm, small gaps having sizes of several hundreds of nm or less are formed between the irregularities of the mold tool surface and the resin surface. If a liquid exists in the small gaps between the solid surfaces, a liquid cross-link referred to as a meniscus occurs due to capillary, and the attractive force (meniscus force) provides a strong adhesive force between the solid surfaces.

With the recent trend toward smaller and more precise electronic or optical components, the demand for the average roughness Ra of the mold tool surface equal to or lower than about 0.2 μm has been increasing. Therefore, the adhesive force or the meniscus force of the thin liquid film formed by aggregation of water or oil in the release agent (if a release agent is used) or the atmosphere, which poses no problem when the mold tool surface roughness is high, has become problematic as a factor of increasing the release resistance.

It is known that the adhesive force due to the meniscus can be significantly reduced by forming fine irregularities on the surface. Patent Literature 1 discloses an art of reducing the release resistance that involves mirror-finishing the mold tool surface that comes into contact with resin until the surface roughness Ra is equal to or lower than 80 nm and then forming a required number of fine recesses or projections on the surface in a required arrangement. A desired releasability is achieved when the fine recesses (projections) having widths ranging from several tens to several hundreds of μm and aspect ratios of 1 or less are formed at intervals ranging from 10 μm to several hundreds of μm.

According to another common method of reducing the release resistance, the adhesive force due to the meniscus is reduced by sparsely making shallow scratches extending in the release direction to form fine recesses after polishing the mold tool surface that comes into contact with resin until the surface roughness Ra is equal to or lower than about 0.2 μm.

Patent literature 1: Japanese Patent Application Laid-Open No. 2008-307735

Non-patent literature 1: Yoshikazu Kobayashi, Kenji Shirai, Tetsuo Sasaki, "Relationship between Core Surface Roughness and Ejection Force for Injection Molding", Journal of Japanese Society of Precision Engineering Vol. 67 (2001), p. 510

SUMMARY OF THE INVENTION

Issues to be Solved by the Invention

In Patent Literature 1 described above, the mold tool surface is processed by grinding to form fine projections (recesses) having widths ranging from 25 to 500 μm and aspect ratios ranging from 0.06 to 1 (heights ranging from 12.5 to 50 μm) at intervals ranging from 10 to 500 μm. That is, projections or recesses having heights or depths ranging from 12.5 to 50 μm are transferred to the molded product. These projections or recesses are negligible for a relatively large molded resin product. However, for a fine molded resin product, such as a housing of a narrow pitch connector having a pitch of 1 mm or less, even a dimension error of several tens of μm is not allowable.

The commonly used method of forming recesses and projections by polishing has a problem that the frictional force due to the anchoring effect or the digging effect increases, so that the net release resistance is not significantly reduced, although the method reduces the adhesive force due to the meniscus because even the smallest recesses formed thereby have a depth of about 100 nm because of the limitations of the polishing device, and sharp-edged scratches are formed.

An object of the present invention is to provide a mold tool and a treatment method for a mold tool surface thereof that can significantly reduce the release resistance without affecting the dimensional precision of a fine product molded from resin, glass, metal or other material.

Means to Solve Issues

For a mold tool according to the present invention, the arithmetic mean roughness Ra of a mold tool surface that comes into contact with a material to be molded measured for a measurement area 10 μm square or smaller is equal to or lower than 5 nm, and fine granular projection structures having diameters ranging from 10 to 80 nm and heights ranging from 10 to 40 nm are formed on the mold tool surface with a density of 400/μm² or higher.

In a treatment method for a mold tool surface according to the present invention, the average roughness Ra of the mold tool surface measured for a measurement area 10 μm square or smaller and the irradiation fluence of a gas cluster ion beam applied to the mold tool surface are in such a relationship that the average roughness Ra first decreases, then increases and finally levels off at a certain value, and the mold tool surface is irradiated with the gas cluster ion beam in an fluence equal to or higher than the irradiation fluence at the time when the average roughness Ra levels off at the certain value.

Effects of the Invention

The mold tool and the treatment method for a mold tool surface thereof according to the present invention can significantly reduce the release resistance without affecting the dimensional precision of a fine molded product.

DETAILED DESCRIPTION OF THE INVENTION

First, a principle and an operation of the present invention will be described.

It has been conventionally considered that the release resistance of a mold tool increases as the surface roughness of the mold tool surface decreases in the range of the average roughness Ra equal to or lower than 0.2 μm. However, the inventors have found a surface geometry that does not increase the release resistance even when Ra is reduced to 0.2 μm or less and a method of forming the surface. That is, the inventors have found that a key to reduce the release resistance is to form fine projections and recesses having heights and widths of about several tens of nm on the mold tool surface while highly planarizing the mold tool surface so that the average roughness Ra measured for a small area (about 10 μm square or smaller) is several nm or lower. In addition, the inventors have found that the fine projections and recesses can be formed by gas cluster ion beam (GCIB). In the following, a mechanism for forming the fine projections and recesses will be described.

The gas cluster ion is an aggregation of several thousands or several tens of thousands of molecules and has a size of about several nm. It is known that when a solid surface is irradiated with a cluster, a fine crater-like structure having a size of about several to 10 nm is formed as a result of the bombardment (Isao Yamada, "Fundamentals and applications of cluster ion beam", p. 57, 70, 71, 72). That is, if an extremely planar surface having a surface roughness Ra of 1 nm or less, such as a silicon wafer, is irradiated with the gas cluster ion beam, the surface is not further planarized, and on the contrary, the surface roughness increases.

Figure 2A:
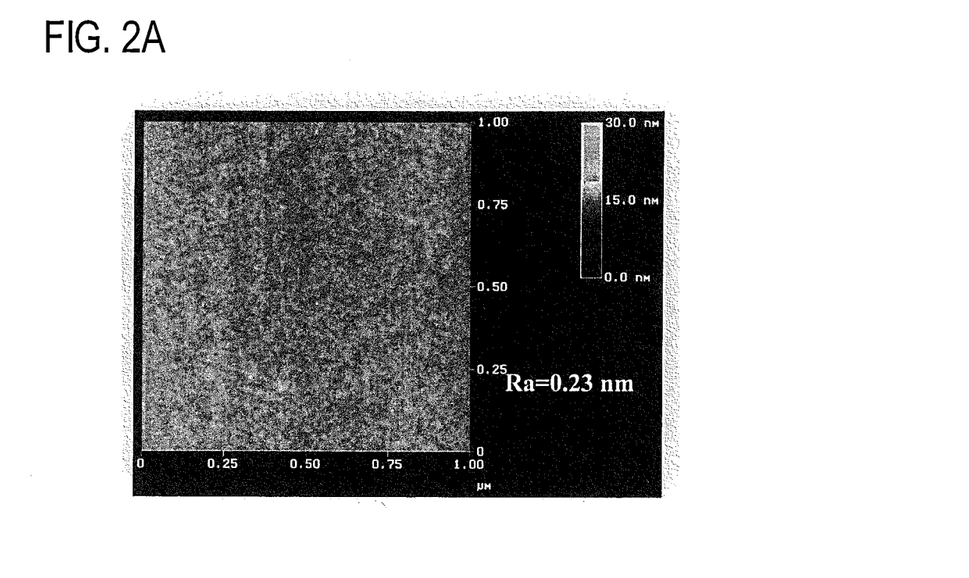
FIG. 2A shows an atomic force microscopy image of a silicon wafer surface before irradiation with a gas cluster ion beam.
Figure 2B:
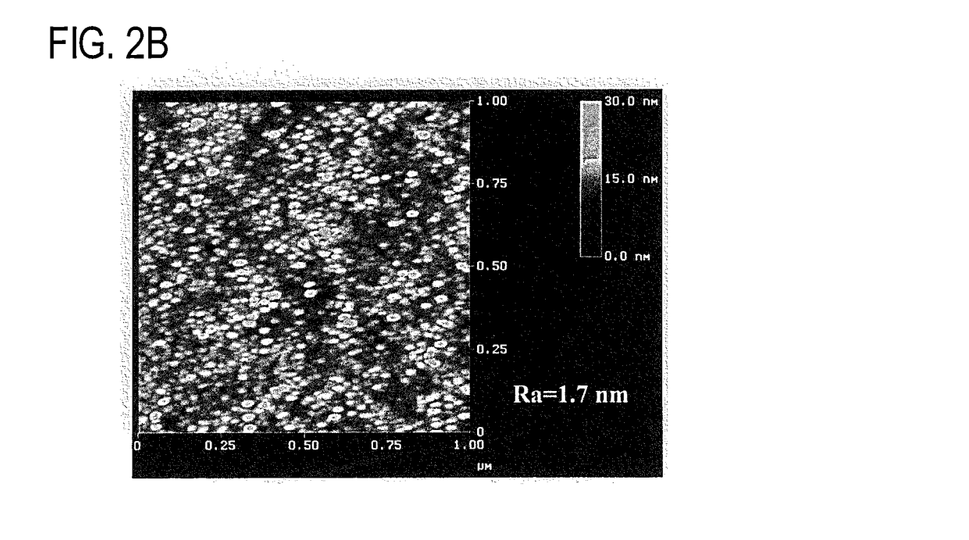
FIG. 2B shows an atomic force microscopy image of the silicon wafer surface after irradiation with the gas cluster ion beam.
Figure 3A:
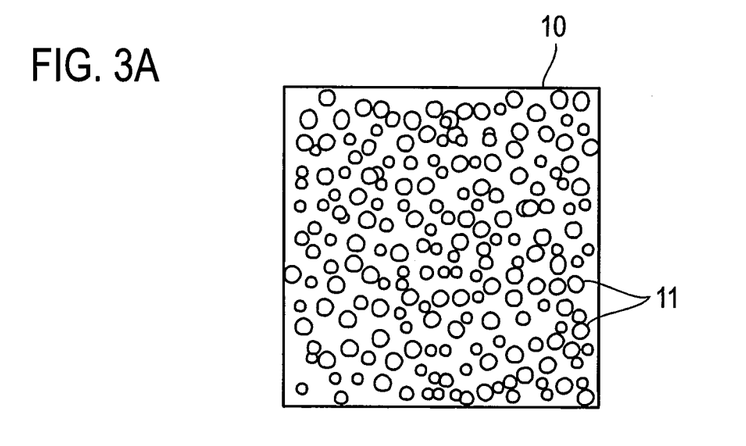
FIG. 3A is a plan view showing the geometry of the silicon wafer surface after irradiation with the gas cluster ion beam.
Figure 3B:
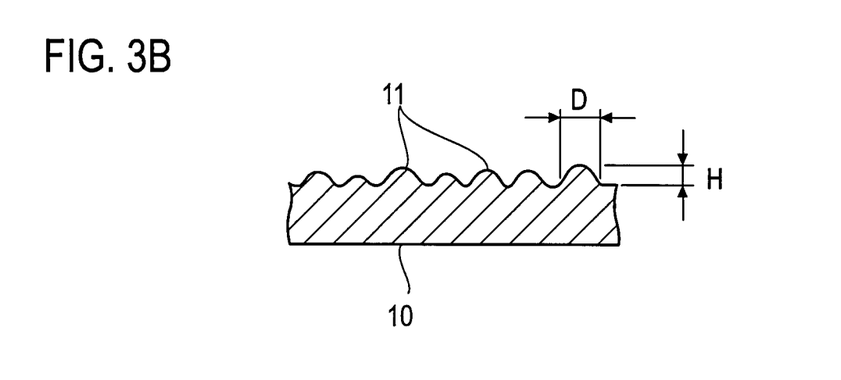
FIG. 3B is a cross-sectional view showing the geometry of the silicon wafer surface after irradiation with the gas cluster ion beam.

FIGS. 2A and 2B are atomic force microscopy (AFM) images of a silicon wafer surface before irradiation with the gas cluster ion beam and after irradiation with an Ar cluster ion beam with an energy of 30 keV and an irradiation fluence of $4 \times 10^{16}$ ions/cm$^2$. The observed area (area for which the average roughness Ra is measured) is an area 1 μm square. FIG. 3A is a diagram showing a surface geometry of a silicon wafer 10 after irradiation with the gas cluster ion beam, and FIG. 3B is a cross-sectional view of the silicon wafer 10. Although the surface is an extremely planar surface having an average roughness Ra of 0.23 nm before irradiation, fine granular projection structures 11 having a diameter D and a height H of about several tens of nm are formed on the surface as a result of irradiation. As a result of irradiation, the surface roughness Ra of the silicon wafer 10 increases to 1.7 nm from 0.23 nm before irradiation.

If the surface is rougher than ordinary wafers and has an average roughness Ra of several nm or more at the start of irradiation, the average roughness Ra decreases while the irradiation with the gas cluster ion beam does not significantly progress because shaving of the projections and filling of the recesses by the lateral sputtering effect are the primary structural change. According to the conventional knowledge, the average roughness Ra does not increase but decreases to a certain value as the irradiation with the cluster ions progresses (Isao Yamada, "Fundamentals and applications of cluster ion beam", pp. 84-85). However, the inventors have first found that the average roughness Ra decreases as the irradiation progresses until it reaches the order of 1 nm, but after that, formation of fine granular projection structures becomes remarkable and slightly increases the surface roughness, as with the silicon wafer described above. This is a phenomenon specific to the cluster irradiation that forms crater-like structures and occurs regardless of the kind of the cluster or the kind of the solid material. The granular structure formation that occurs following the decrease of Ra (planarization) of a rough surface described above is applied to form fine recesses and projections having heights and widths of several tens of nm to reduce the release resistance.

In the following, examples of the present invention will be described with regard to experiments.

Experiment 1

The relationship between the geometry of a surface of an injection mold tool that comes into contact with resin and the releasability of resin was examined.

Using the tool steel SKD61 as the material of the mold tool and a liquid crystal polymer as the resin material, a thin rectangular parallelepiped resin part having a length of 35 mm, a width of 3 mm and a height of 0.2 mm was molded. Three types of mold tools (mold tools 1 to 3) having different surface geometries were prepared. The surface of the mold tools 1 to 3 was treated as described below.

Mold tool 1: Ground with #400 grindstone
    Mold tool 2: Ground with #600 grindstone
    Mold tool 3: Ground with #600 grindstone and irradiated with gas cluster ion beam The irradiation with gas cluster ion beam was carried out under conditions that an Ar cluster ion beam was used, the acceleration energy was 20 keV, and the irradiation fluence was $5.0 \times 10^{17}$ ions/cm$^2$.

Figure 4:
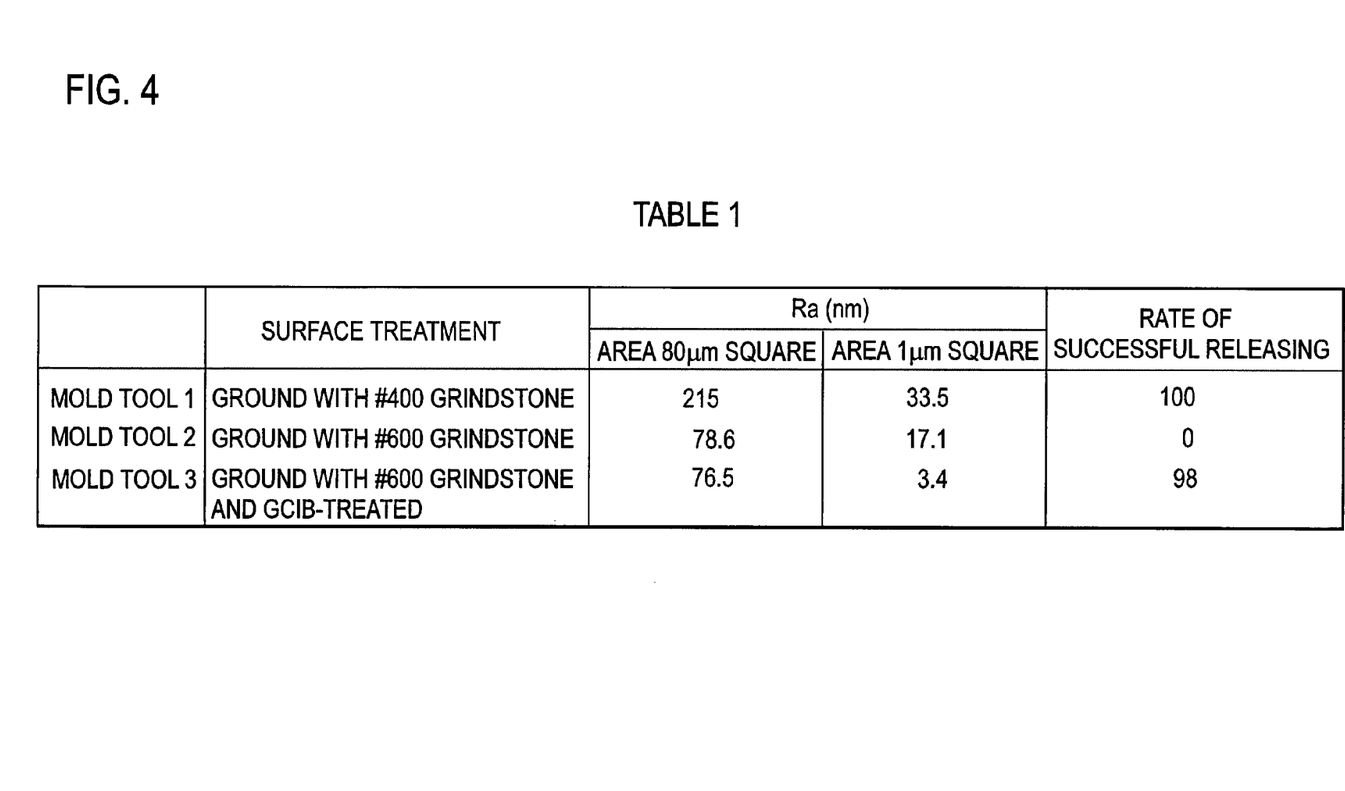
FIG. 4 is a table showing the surface treatment, the average roughness Ra and the rate of successful releasing for mold tools 1 to 3.

The set resin part was released from the mold tool by pushing the edge of the resin part with an ejector pin. Molding and releasing with the ejector pin were repeated 50 times for each of the three mold tools 1 to 3 with the pushing force of the ejector pin kept constant, the rate of successful releasing was calculated for each mold tool from the number of set resin parts successfully released from the mold tool, and the rates of successful releasing for the mold tools were compared with each other. The result is shown in the table 1 shown in FIG. 4.

Figure 5A:
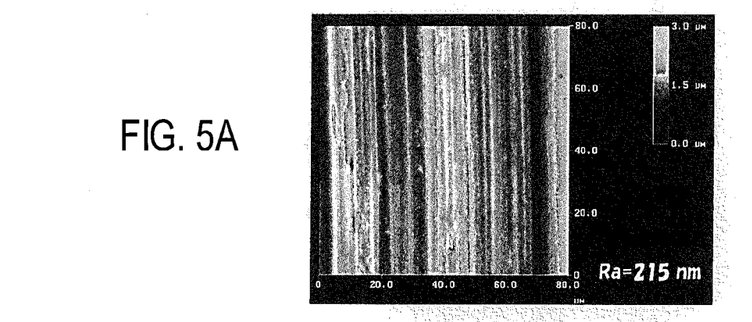
FIG. 5A shows an atomic force microscopy image of the surface of the mold tool 1 (an area 80 μm square)
Figure 5B:
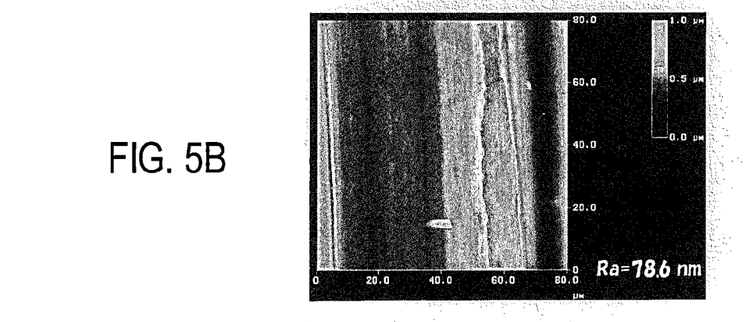
FIG. 5B shows an atomic force microscopy image of the surface of the mold tool 2 (an area 80 μm square)
Figure 5C:
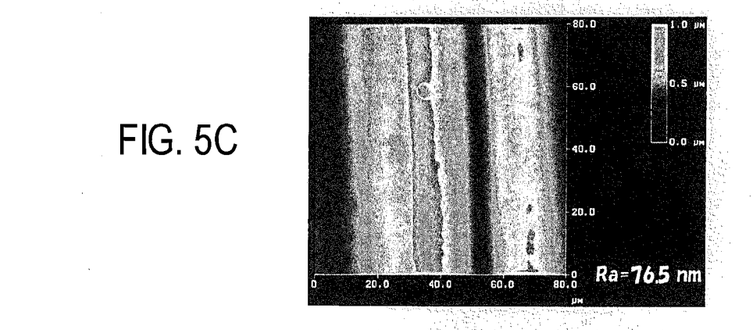
FIG. 5C shows an atomic force microscopy image of the surface of the mold tool 3 (an area 80 μm square)
Figure 6:
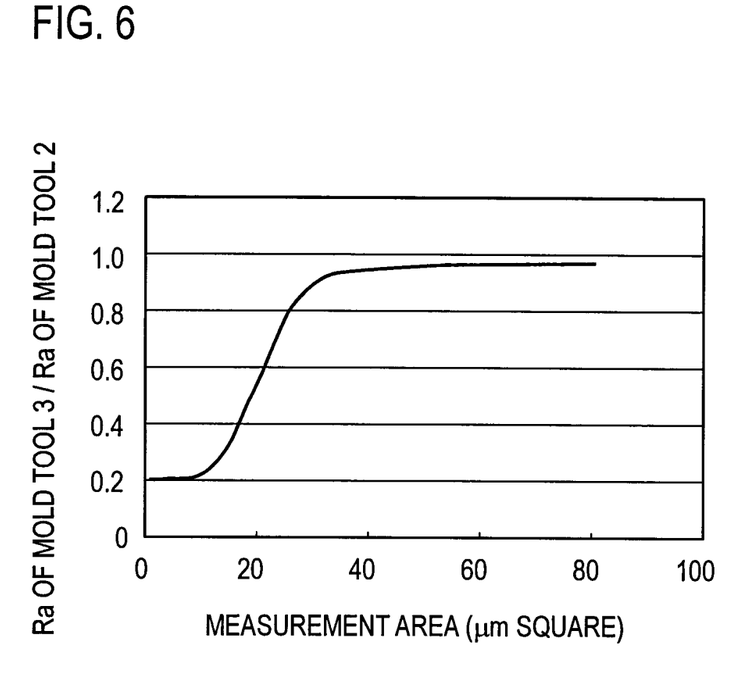
FIG. 6 is a graph showing a relationship between the size of the measurement area (size of the area observed with an atomic force microscope) and the ratio between the average roughness Ra before irradiation with the gas cluster ion beam and the average roughness Ra after irradiation with the gas cluster ion beam (Ra of the mold tool 3/Ra of the mold tool 2)

In addition, the surface geometry of the mold tools 1 to 3 was observed with an AFM. The average roughness Ra of the mold tools 1 to 3 evaluated for areas 80 μm square and 1 μm square is also shown in the table 1 shown in FIG. 4. FIGS. 5A to 5C are typical AFM images of the mold tools 1 to 3 (an area 80 μm square). FIG. 6 is a graph showing a relationship between the size of the AFM observation area (which equals to the size of the Ra measurement area) and the ratio between Ra before irradiation with the gas cluster ion beam and Ra after irradiation with the gas cluster ion beam (Ra before irradiation is that of the mold tool 2, and Ra after irradiation is that of the mold tool 3).

Figure 5D:
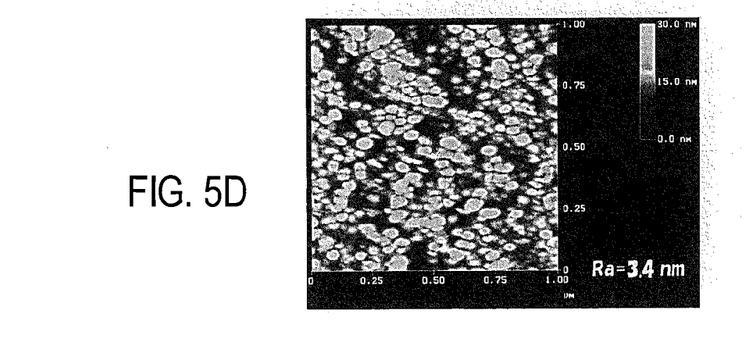
FIG. 5D shows an atomic force microscopy image of the surface of the mold tool 3 (an area 1 82 m square)

FIG. 5D shows an enlarged AFM image of an area 1 μm square of the surface of the mold tool 3 with a height scale of 30 nm. As can be seen from this drawing, fine granular projection structures having diameters ranging from 20 to 50 nm and heights ranging from 10 to 30 nm are formed on the surface of the mold tool 3. On the other hand, the fine granular projection structures observed on the mold tool 3 are not observed on the surface of the mold tools 1 and 2.

Experiment 2

The relationship between the surface geometry of injection mold tools of the same type as those in the experiment 1 (except that the material was SKD11) and the releasability of the resin contact surface thereof was examined for various gas cluster ion beam irradiation conditions.

Figure 7:
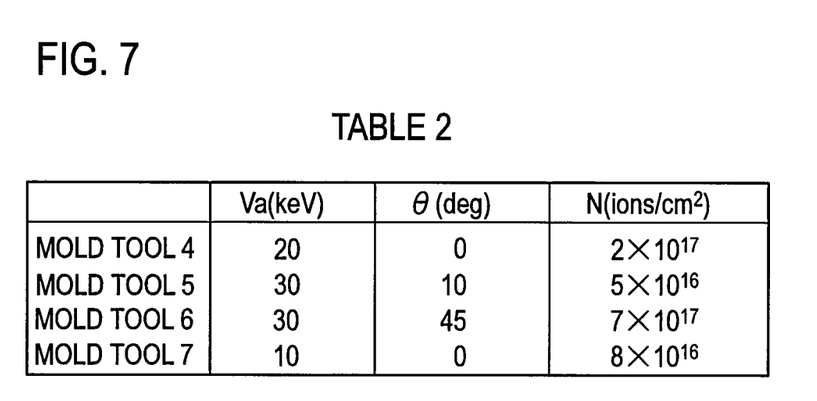
FIG. 7 is a table showing conditions of irradiation with the gas cluster ion beam for mold tools 4 to 7.
Figure 8:
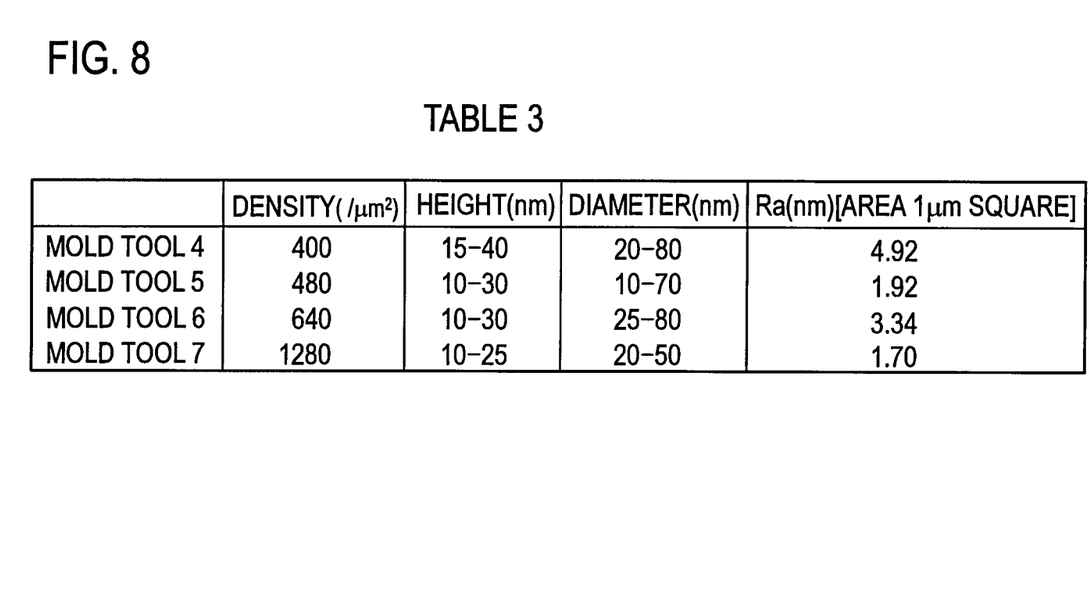
FIG. 8 is a table showing the density, the height and the diameter of fine granular projection structures formed on the surface of the mold tools 4 to 7 and the arithmetic surface roughness Ra of the mold tools.

The gas cluster ion beam irradiation conditions were that an Ar cluster ion beam was used, and the acceleration energy Va, the irradiation angle θ and the irradiation fluence N were changed as shown in the table 2 shown in FIG. 7. The table 3 shown in FIG. 8 shows results of measurement of the density, the height and the diameter of fine granular projection structures formed by irradiation on the resin contact surface of mold tools 4 to 7 shown in the table 2 and the average roughness Ra for an area 1 μm square of the mold tools 4 to 7. No fine granular projection structures were observed on the mold tool surface that was not irradiated. In addition, the rate of successful releasing was examined for the mold tools 4 to 7 in the same manner as in the experiment 1. The rate of successful releasing was 94 to 100% for the mold tools 4 to 7 that were irradiated with the gas cluster ion beam, although the rate of successful releasing was 0% for the mold tools that were not irradiated with the gas cluster ion beam.

Experiment 3

Mold tools of the same type as those in the experiment 1 were made of SKD11 (tool steel) or V20 (a carbide material made of tungsten carbide and cobalt (Co) as a binder), and the relationship between the irradiation fluence of a gas cluster ion beam and the changes of the surface geometry was examined.

Figure 9:
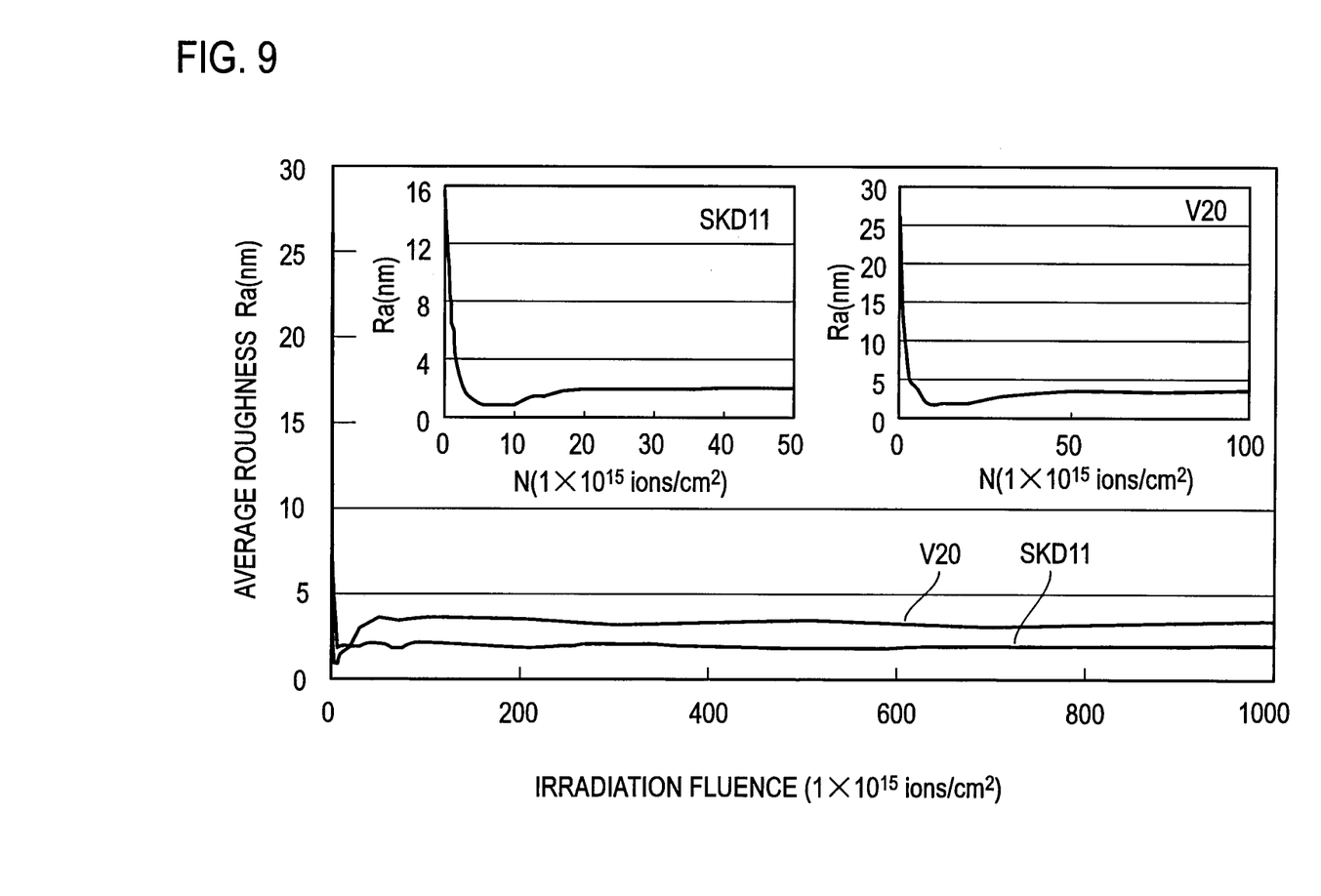
FIG. 9 is a graph showing a relationship between the irradiation fluence N of gas cluster ion beam and the average roughness Ra (for an area 1 μm square)

The gas cluster ion beam irradiation conditions were that the mold tool surface was perpendicularly irradiated with an Ar cluster ion beam with an acceleration energy of 20 keV. FIG. 9 is a graph showing a relationship between the irradiation fluence and the average roughness Ra evaluated for an area 1 μm square. The small graphs in the graph are enlarged graphs showing Ra for the mold tools made of SKD11 and V20 over a narrower range of irradiation fluence. Fine granular projection structures similar to those shown in FIG. 5D were observed when the irradiation fluence was equal to or higher than $2 \times 10^{16}$ ions/cm$^2$ for the mold tool made of SKD11 and when the irradiation fluence was equal to or higher than $5 \times 10^{16}$ ions/cm$^2$ for the mold tool made of V20.

Figure 10:
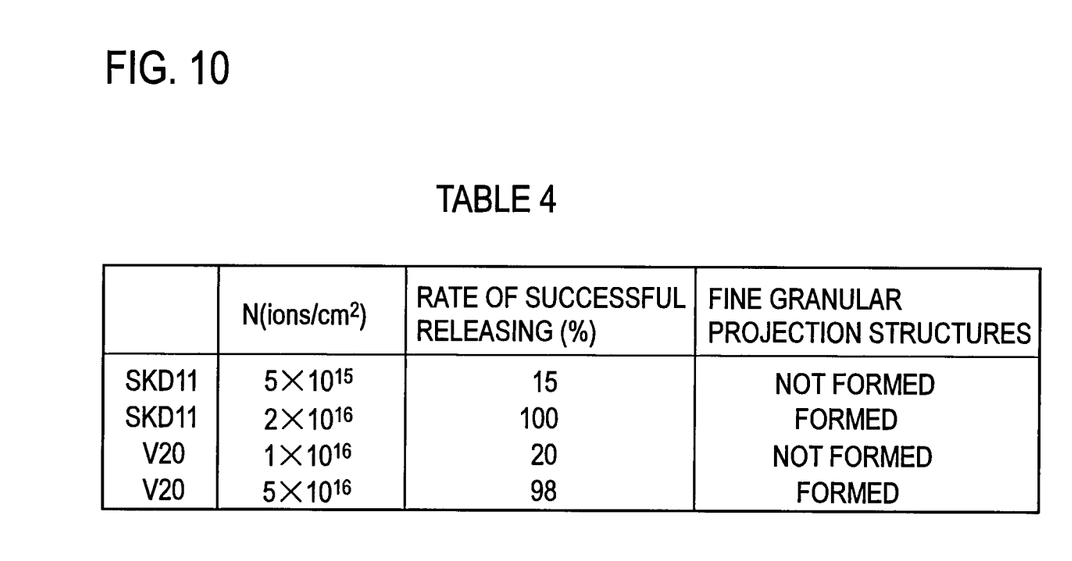
FIG. 10 is a table showing a relationship among the irradiation fluence N of gas cluster ion beam, the rate of successful releasing and the presence or absence of fine granular projection structures.

The relationship between the gas cluster ion beam irradiation fluence and the releasability of these mold tools was examined in the same manner as in the experiment 1. The result and the presence or absence of fine granular projection structures are shown in the table 4 shown in FIG. 10.

[Consideration]

Based on the results of the experiments 1 to 3, the relationship between the surface geometry and the release resistance of the mold tools will be considered.

The periodicity of the roughness of a solid surface is variable. For example, the surface of an injection mold tool for an electronic component, such as a connector, has a surface roughness of the order of several tens of nm to 1 μm due to cutting and polishing of the mold tool material and has tool marks with a periodicity of several tens of μm due to grinding in the mold tool shaping process. That is, the periodicity of the surface roughness ranges widely from several tens of nm to several tens of μm. Therefore, in many cases, the surface roughness of the entire mold tool surface is measured for a measurement area several tens of μm square to 100 μm square. In the experiments described above, a measurement area 80 μm square was used.

However, smaller recesses and projections are also formed with a smaller periodicity on the large recesses and projections formed with a periodicity of several tens of μm, and the size of these smaller recesses and projections is difficult to accurately measure in the measurement area 80 μm square. Therefore, in the experiments described above, a smaller measurement area was used for measurement thereof.

Referring to the experiment 1, as shown in the table 1, although the mold tools 2 and 3 have approximately equal Ra for the area 80 μm square, Ra of the mold tool 3 decreases more remarkably than Ra of the mold tool 2 as the measurement area becomes smaller (FIG. 6). That is, gas cluster ion beam irradiation reduces more quickly the roughness with a smaller periodicity than the roughness with a larger periodicity. This is probably because the range of the lateral sputtering effect of the gas cluster ion beam is about several hundreds of nm. In other words, although the surface roughness with a larger periodicity is unlikely to be reduced, the surface roughness with a smaller periodicity is likely to be reduced, and the surface roughness is remarkably reduced for an area 10 µm square or smaller. For measurement areas 1 to 10 µm square, Ra of the mold tool 3 is about one fifth of Ra of the mold tool 2.

In the AFM images shown in FIGS. 5B and 5C, sharp longitudinal grinding marks are observed in the area 80 µm square of the mold tool 2, although the edges of the marks on the mold tool 3 are blunted and made obscure. That is, gas cluster ion beam irradiation can hardly significantly reduce the height of the projections with a large periodicity (and therefore can hardly significantly reduce Ra) but can blunt the sharp edges of the projections.

As described above, gas cluster ion beam irradiation is characterized in that it can reduce the recesses and projections with a small periodicity of about 10 µm and blunt sharp edges. Furthermore, as can be observed in the AFM image of the area 1 µm square of the surface of the mold tool 3 shown in FIG. 5D, the surface planarized with the gas cluster ion beam has a characteristic surface geometry that contains fine granular projection structures having sizes and heights of about several tens of nm. In the following, the relationship between the changes of the surface geometry due to gas cluster ion beam irradiation and the rate of successful releasing will be discussed.

Referring to the experiment 1, while the rate of successful releasing is 100% for the mold tool 1, the rate is 0% for the mold tool 2. That is, the mold tool 2 has no releasability. A possible reason why the mold tool 2 has a larger release resistance than the mold tool 1 is that the average roughness Ra of the mold tool 2 measured for the area 80 µm square is smaller than 0.2 µm and falls within the range where the meniscus force is predominant, so that the adhesive force between the mold tool surface and the resin increases.

Comparing the mold tools 2 and 3, the mold tool 3 has a high rate of successful releasing of 98%. The mold tools 2 and 3 have approximately equal Ra for the area 80 µm square, and thus, the reason why the mold tool 3 has a lower release resistance than the mold tool 2 cannot be explained from the value of Ra. A possible reason for this is as follows. With regard to microscopic surface geometry changes, gas cluster ion beam irradiation eliminates sharp edges to reduce the frictional force due to the anchoring effect and digging effect. In addition, gas cluster ion beam irradiation forms fine recesses and projections on the planarized surface having Ra of several nm to reduce the meniscus force. Thus, the release resistance does not increase even in an area having a surface roughness smaller than 0.2 µm, and a high releasability is achieved.

Referring to the experiment 2, mold tool surfaces having high releasability have an average roughness Ra measured for the area 1 µm square of 5 nm or lower and have fine granular projection structures having diameters ranging from 10 to 80 nm and heights ranging from 10 to 40 nm formed with a density of 400/µm or higher. As described later, the fine projection structures are formed by irradiation with a required fluence N of gas cluster ion beam independently of the irradiation conditions of the gas cluster ion beam, such as the irradiation angle θ and the acceleration energy Va.

Referring to the experiment 3, the average roughness Ra of the mold tool surface first decreases, then increases, and finally levels off at a certain value as the irradiation fluence of gas cluster ion beam increases. The fine granular projection structures are observed when Ra levels off at a certain value after increasing, that is, when the irradiation fluence is $2\times10^{16}$ ions/cm$^2$ for the mold tool made of SKD11 and is $5\times10^{16}$ ions/cm$^2$ for the mold tool made of V20. However, no fine granular projection structures are observed when Ra is minimized, that is, when the irradiation fluence is $5\times10^{15}$ ions/cm$^2$ for the mold tool made of SKD11 and is $1\times10^{16}$ ions/cm$^2$ for the mold tool made of V20. Thus, it can be considered that the increase of Ra is caused by formation of the fine projection structures. The mold tool surface having the fine granular projection structures has a remarkably higher rate of successful releasing than the mold tool surface having no fine granular projection structures. The fine recesses and projections on the mold tool surface that reduce the release resistance can be formed by using an irradiation fluence that falls within the range where the average roughness Ra levels off at a certain value after increasing with the irradiation fluence.

As described above, even for a mold tool surface having an average roughness Ra of 0.2 µm or lower, which has conventionally posed a problem of high release resistance, the release resistance can be reduced by forming fine granular projection structures on the mold tool surface. Although the release resistance of the injection mold tool used for molding a resin has been described, the surface geometry of the mold tool according to the present invention is intended to reduce the adhesive force between any two materials coming into contact with each other and is equally effective in the cases where other materials, such as glass and metal, are molded. In addition, the type of molding is not limited to the injection molding, and any types of molding are possible, such as the nanoimprinting molding that transfers the shape of the mold tool by pressing (stamping) the mold tool against a material to be molded, such as a resin, glass and an organic thin film. Furthermore, the mold tool and the treatment method for mold tool surface according to the present invention can be applied to reduce the adhesive force between a mold tool and a material to be molded in the case where the material to be molded comes into contact with the mold tool surface, such as in the bending or chamfering processing in the press molding.

What is claimed is:

1. A treatment method for a mold tool surface of a mold tool that comes into contact with a material to be molded, comprising: providing an average roughness Ra of the mold tool surface measured for an area from 1 µm to 10 µm square and irradiation fluence of a gas cluster ion beam applied to the mold tool surface are in such a relationship that the average roughness Ra first decreases, then increases and finally levels off at a certain value as the irradiation fluence increases, and the mold tool surface is irradiated with the gas cluster ion beam in a fluence equal to or higher than the irradiation fluence at the time when the average roughness Ra levels off at the certain value.

2. A treatment method, comprising providing a mold tool surface of a mold tool that comes into contact with a material to be molded, wherein an average roughness Ra of the mold tool surface measured for an area from 1 µm to 10 µm square and irradiation fluence of a gas cluster ion beam applied to the mold tool surface are in such a relationship that the average roughness Ra first decreases, then increases and finally levels off at a certain value as the irradiation fluence increases, and the mold tool surface is irradiated with the gas cluster ion beam in a fluence equal to or higher than the irradiation fluence at the time when the average roughness Ra levels off at the certain value, thereby making the average roughness Ra of the mold tool surface measured for an area from 1 µm to 10 µm square is equal to or lower than 5 nm and forming fine granular projection structures having diameters ranging from 10 to 80 nm and heights ranging from 10 to 40 nm on the mold tool surface with a density of 400/µm$^2$ or higher.

* * * * *

UNITED STATES PATENT AND TRADEMARK OFFICE
CERTIFICATE OF CORRECTION

PATENT NO. : 9,056,405 B2
APPLICATION NO. : 13/913335
DATED : June 16, 2015
INVENTOR(S) : Akinobu Sato et al.

It is certified that error appears in the above-identified patent and that said Letters Patent is hereby corrected as shown below:

In the Specification

At Column 3, line 33, BRIEF DESCRIPTION OF THE DRAWINGS, of the printed patent, "(an area 1 82 m square)" should read --(an area 1 μm square)--.

At Column 7, line 53, DETAILED DESCRIPTION OF THE INVENTION, of the printed patent, "density of 400/μm or higher" should read --density of $400/\mu m^2$ or higher--.

In the Claims

At Column 8, line 62, (Claim 2, line 14) of the printed patent, "square is equal to" should read --square equal to--.

Signed and Sealed this
Twenty-second Day of December, 2015

Michelle K. Lee
*Director of the United States Patent and Trademark Office*